United States Patent
Barrasso (10) Patent No.: US 10,142,328 B1
(45) Date of Patent: Nov. 27, 2018

(54) ACCOUNT ENROLLMENT SYSTEMS AND PROCESSES

(71) Applicant: Securus Technologies, Inc., Dallas, TX (US)

(72) Inventor: Charles Barrasso, Franklin, MA (US)

(73) Assignee: Securus Technologies, Inc., Carrollton, TX (US)

( * ) Notice: Subject to any disclaimer, the term of this patent is extended or adjusted under 35 U.S.C. 154(b) by 159 days.

(21) Appl. No.: 14/975,774

(22) Filed: Dec. 19, 2015

(51) Int. Cl.
| H04L 29/06 | (2006.01) |
| G06Q 50/26 | (2012.01) |
| G06F 21/62 | (2013.01) |

(52) U.S. Cl.
CPC ........ H04L 63/083 (2013.01); G06F 21/6245 (2013.01); G06Q 50/26 (2013.01); H04L 63/0861 (2013.01)

(58) Field of Classification Search
CPC .............. H04L 63/083; H04L 63/0861; G06F 21/6245; G06Q 50/26
USPC ........................................................... 726/6
See application file for complete search history.

(56) References Cited

U.S. PATENT DOCUMENTS

| 2003/0167207 A1* | 9/2003 | Berardi | G06Q 10/025 705/16 |
| 2010/0299002 A1* | 11/2010 | Abdallah | G06Q 50/265 701/2 |
| 2013/0081119 A1* | 3/2013 | Sampas | G06Q 20/206 726/7 |
| 2016/0063235 A1* | 3/2016 | Tussy | G06F 21/32 726/6 |
| 2017/0134375 A1* | 5/2017 | Wagner | H04L 63/0861 |

* cited by examiner

*Primary Examiner* — Harunur Rashid
*Assistant Examiner* — Sakinah White Taylor
(74) *Attorney, Agent, or Firm* — Fogarty LLP (57) ABSTRACT

Systems and methods, which can provide for user enrollment of an account, are provided. The enrollment of an account can be performed in a controlled-environment facility using a system(s) that provides assurance that the user of an account was the person that enrolled the account. A method, which may be employed in various systems and/or facilities, includes, using an enrollment module operating on at least one processor, generating respective confidential codes associated with user accounts. Each of the user accounts has at least one of the confidential codes and is for a respective one user. The method also includes receiving, at the enrollment module, respective enrollment information of each of enrolling individuals. The respective enrollment information is to enroll respective ones of the user accounts. The method further includes, after the receiving, transmitting from the enrollment module the respective confidential codes associated with the respective ones of the user accounts.

16 Claims, 4 Drawing Sheets

ACCOUNT ENROLLMENT SYSTEMS AND PROCESSES

TECHNICAL FIELD

The present disclosure relates generally to account enrollment in a network, and more particularly to providing an environment in which assurance of a proper account enrollment in a network is increased.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services of controlled-environment facilities (such as correctional facilities) include allowing residents (e.g., inmates) to place outbound phone calls to non-residents of the controlled-environment facility. However, residents of controlled-environment facilities are typically restricted from unauthorized communications with individuals outside of the controlled-environment facility. For example, in correctional facilities, inmates are typically prohibited from unauthorized communications with individuals outside of the correctional facility. Thus, many controlled-environment facilities implement systems that aim to prevent communications to unauthorized individuals.

One system that may be used, for example, in the context of telecommunications systems, may implement an account for each resident of the controlled-environment facility. The account for each resident may be associated with the resident's name and personal identification number (PIN), a financial account for payment of communications, and various biometric indications, such as sample voice recordings, for ensuring that the person using the account for communications is the resident identified with the account. A resident, once enrolled in the account, can then access the account for communications, such as telephone calls.

In some instances, it may be important to ensure that the person actually placing a telephone call is the resident associated with the account used to place the telephone call. The account can be used to restrict to whom a call can be placed, and recordings of the call can be monitored to identify illicit or illegal activity. Hence, it is important that controlled-environment facilities can be confident that the person placing the call is the appropriate resident associated with the account so that calls can be appropriately restricted and the proper person can be identified as carrying out any illicit or illegal activities. However, this can be undermined if the person enrolling in the account is not actually the resident associated with the account.

SUMMARY

The present disclosure is directed to systems and methods which can provide for user enrollment of an account. The enrollment of an account can be performed in a controlled-environment facility using a system(s) that can allow for greater efficiency and use of human resources in the controlled-environment facility while providing assurance that the user of an account was the person that enrolled the account. The users enrolled using the systems and methods described herein may include residents and staff of the controlled-environment facility as well as residents' friends and family. Residents may be enrolled as a group or during a check-in process. The residents' friends and family may be enrolled during visitations or at other appropriate times. Past systems required one-to-one ratio between the enrolling supervisor and the account user. The account enrollment process described herein allows one supervisor to enroll multiple people at one time and to ensure that multiple simultaneous enrollments are accurate. As a result, large numbers of residents, staff, friends, and/or family can be enrolled quickly using the systems and methods set forth below.

An example embodiment is a method, which may be employed in various systems and/or facilities, that includes using an enrollment module operating on at least one processor, generating respective confidential codes associated with user accounts, where each of the user accounts has at least one of the confidential codes, and each of the user accounts is for a respective one user. The user accounts contain respective user identification information stored in a database. The method also includes receiving, at the enrollment module, respective enrollment information of each of enrolling individuals. The respective enrollment information is to enroll respective ones of the user accounts. The method further includes, after receiving the respective enrollment information to enroll respective ones of the user accounts, transmitting from the enrollment module the respective confidential codes associated with the respective ones of the user accounts.

In some instances, in the method, each of the respective enrollment information is provided at an enrollment terminal, under supervision of a supervisor, by the respective one of the enrolling individuals to be transmitted by the enrollment terminal to the enrollment module. The method can further include, for each of the enrolling individuals: identifying, by the supervisor, a correct confidential code listed on the roster based on matching an observed identity of the respective one of the enrolling individuals with the respective user identification information of a respective one of the user accounts listed on the roster; and identifying, by the supervisor, that enrollment of the respective one of the user accounts was not by the user of the respective one of the user accounts when the correct confidential code listed on the roster does not match the respective one of the confidential codes transmitted by the enrollment module for the respective one of the enrolling individuals.

Another embodiment is a system. The system includes a database device configured to operate a database, and enrollment terminal, and an enrollment server device configured to operate an enrollment module. The database is capable of storing user account information of a user account of a user. The enrollment terminal is communicatively coupled to the enrollment server device, and the database device is communicatively coupled to the enrollment server device. The enrollment module is configured to generate a random confidential code associated with the user account, receive enrollment information from an enrolling individual through the enrollment terminal for the user account, and after receiving the enrollment information, transmit the random confidential code to the enrollment terminal.

A further embodiment is a non-transitory computer-readable storage medium having a computer program embodied thereon. The computer program includes program code instructions for generating respective confidential codes for user accounts; program code instructions for generating a roster, where the roster is to contain a list of respective user identification information and respective confidential codes of the user accounts; program code instructions for receiving first enrollment information for a first one of the user accounts; and program code instructions for, upon successfully receiving the first enrollment information for the first one of the user accounts, transmitting a first one of the confidential codes that is associated with the first one of the user accounts.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present disclosure in order that the detailed description that follows may be better understood. Additional features and advantages will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described some embodiments in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Other embodiments may be applied in many different forms, and this disclosure should not be construed as limited to the embodiments set forth herein. Rather, the example embodiments herein are provided so that this disclosure will be thorough and complete, and will fully convey the scope of the invention to those skilled in the art. One skilled in the art may be able to use the various embodiments of the invention.

Embodiments described below are described in the context of a computing and/or telecommunications environment. One having ordinary skill in the art will readily understand variations to the environment that may be made, such as modifications to networking, including whether devices (such as terminals, servers, databases, etc.) are directly operatively coupled together or operatively coupled together through a network (such as a local area network (LAN), the Internet, a combination thereof, or the like). Further, various processes may be described below as being performed on various devices, but one having ordinary skill in the art will readily understand that different processes can be performed on different devices or a combination of processes can be performed on one device, for example.

Additionally, this disclosure may describe embodiments being used in the context of a controlled-environment facility. Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of a correctional facility, or the like. It should be understood, however, that the systems and methods described herein may be similarly applicable to other types of controlled-environment facilities and their respective residents (e.g., a hospital and its patients, a school dormitory and its students, etc.). Various concepts of this disclosure, however, may be applied to other contexts in which proper account enrollment assurance may be desirable.

Figure 1:
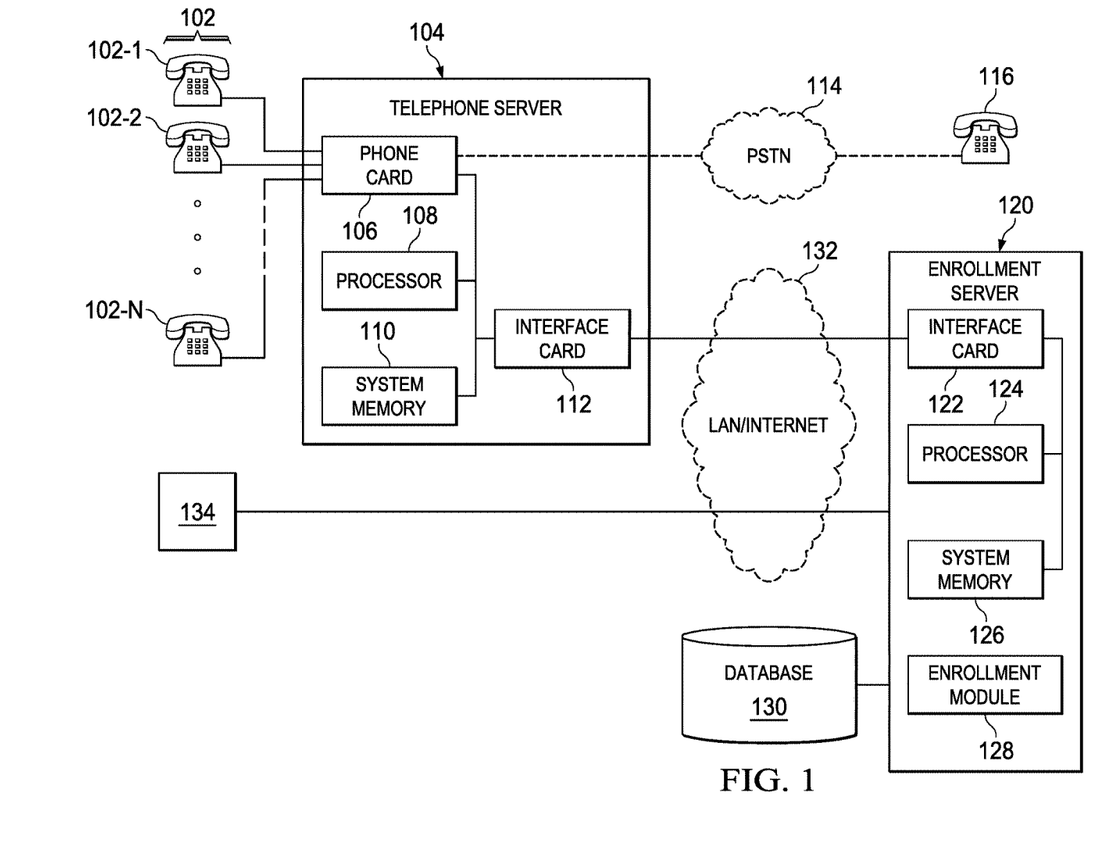
FIG. 1 is a diagrammatic illustration of example enrollment system in accordance with some embodiments.

FIG. 1 is a diagrammatic illustration of example enrollment system in accordance with some embodiments. One or more components of the enrollment system may be located on-site at a controlled-environment facility while other components may be located remotely from the controlled-environment facility. The illustrated enrollment system includes an enrollment terminal bank 102 in an enrollment center that includes a first enrollment terminal 102-1, a second enrollment terminal 102-2, and an Nth enrollment terminal 102-N. The enrollment center may include the booking area, housing unit, dayroom, or any area with one or more enrollment terminals. The enrollment terminal bank 102 can include any number of enrollment terminals. The enrollment terminals 102-1 through 102-N in the illustrated embodiment are telephones, but other devices such as computers, tablets, or the like are also contemplated as enrollment terminals. The enrollment terminals 102-1 through 102-N are connected to one or more phone card (PC) 106 in a telephone server device 104. The enrollment terminals 102-1 through 102-N may be dedicated for enrollment or, as illustrated by dashed lines, may be optionally coupled by the PC 106 to a public switched telephone network (PSTN) 114 for communications with a remote device 116, such as a telephone. It will be understood that in various embodiments, the enrollment terminal does not need to be a dedicated enrollment device, but it may also operate as a telephone, video visitation terminal, computer, or the like.

The telephone server device 104 operates a telephone server and includes, in addition to the PC 106, one or more processor (PROC) 108, such as a central processing unit (CPU), system memory (MEM) 110, and an interface card (INT) 112 coupled together by one or more bus. In various embodiments, the telephone server device 104 may be a single-processor system including one processor 108, or a multi-processor system including two or more processors 108 (e.g., two, four, eight, or another suitable number). Processor(s) 108 may be any processor capable of executing program instructions. For example, in various embodiments, processor(s) 108 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 108 may commonly, but not necessarily, implement the same ISA.

System memory 110 may be configured to store program instructions and/or data accessible by processor(s) 108. In various embodiments, system memory 110 may be implemented using any suitable tangible or non-transitory memory medium, such as static random access memory (SRAM), synchronous dynamic RAM (SDRAM), nonvolatile/Flash-type memory, or any other type of memory. As illustrated, program instructions and data implementing certain operations may be stored within system memory 110 as program instructions and data storage, respectively. In other embodiments, program instructions and/or data may be received, sent, or stored upon different types of computer-accessible media or on similar media separate from system memory 110 or the telephone server device 104. Generally speaking, a computer-readable medium may include any tangible or non-transitory storage media or memory media such as magnetic or optical media—e.g., disk or CD/DVD-ROM coupled to the telephone server device 104 via an input/output (I/O) interface (not specifically illustrated), flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via interface card 112.

System memory 110 may include program instructions, configured to implement certain embodiments described herein, and data storage comprising various data accessible when program instructions are operated. In an embodiment, program instructions may include software elements corresponding to one or more of the various embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. In other embodiments, other or different software elements and data may be included.

Interface card 112 may be configured to allow data to be exchanged between the telephone server device 104 and another device directly attached to the telephone server device 104 or other devices attached to a network, such as other computer systems, such as a server device. In various embodiments, interface card 112 may support communication via wired and/or wireless general data networks, such as any suitable type of Ethernet network, for example; via telecommunications/telephony networks such as analog voice networks or digital fiber communications networks; via storage area networks such as Fiber Channel storage-area networks (SAN), or via any other suitable type of network and/or protocol. This may include the use of Network File System (NFS) or Session Initiation Protocol (SIP)/Real-time Transport Protocol (RTP) over Ethernet.

The telephone server device 104 is coupled via interface card 112 of the telephone server device 104 to an interface card (INT) 122 of an enrollment server device 120. The enrollment server device 120 operates an enrollment server with an enrollment module 128, and includes, in addition to the interface card 122, one or more processor (PROC) 124, such as a CPU, and system memory (MEM) 126 coupled together by one or more bus. In various embodiments, enrollment server device 120 may be a single-processor system including one processor 124, or a multi-processor system including two or more processors 124 (e.g., two, four, eight, or another suitable number). Processor(s) 124 may be any processor capable of executing program instructions, such as discussed above for processor(s) 108.

System memory 126 may be configured to store program instructions and/or data accessible by processor(s) 124. In various embodiments, system memory 126 may be implemented using any suitable tangible or non-transitory memory medium, such as SRAM, SDRAM, nonvolatile/Flash-type memory, or any other type of memory. As illustrated, program instructions and data implementing certain operations, such as, for example, those described below, may be stored within system memory 126 as program instructions and data storage, respectively. In other embodiments, program instructions and/or data may be received, sent or stored upon different types of computer-accessible media or on similar media separate from system memory 126 or the enrollment server device 120. Generally speaking, a computer-readable medium may include any tangible or non-transitory storage media or memory media, such as discussed above with respect to system memory 110. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via interface card 122.

System memory 126 may include program instructions, configured to implement certain embodiments described herein, and data storage comprising various data accessible when program instructions are operated. In an embodiment, program instructions may include software elements corresponding to one or more of the various embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. In other embodiments, other or different software elements and data may be included.

The enrollment module 128 may include program code instructions stored on the system memory 126 or other tangible, non-transitory memory that when operated on the processor(s) 124 performs one or more specific tasks, such as tasks described below. The enrollment module 128 can include additional sub-modules and/or one or more routines.

Interface card 122 may be configured to allow data to be exchanged between the enrollment server device 120 and another device directly attached to the enrollment server device 120 or other devices attached to a network, such as other computer systems, such as a server. In various embodiments, interface card 122 may support communication via wired or wireless general data networks, such as any suitable type of Ethernet network, for example; via telecommunications/telephony networks such as analog voice networks or digital fiber communications networks; via storage area networks such as Fibre Channel SANs, the use of NFS or SIP/RTP over Ethernet, or via any other suitable type of network and/or protocol.

One of ordinary skill in the art will readily understand that although the telephone server and the enrollment server have been described as operating on separate server devices—the telephone server device 104 and the enrollment server device 120, respectively—the telephone server and the enrollment server may be operated together on a single server device, e.g., as virtual servers or the server may contain both functions. Further, FIG. 1 illustrates a direct connection, using interface cards 112 and 122 of the telephone server device 104 and the enrollment server device 120, respectively, between the telephone server device 104 and the enrollment server device 120. In other embodiments, a network 132 may optionally be used to couple the telephone server device 104 and the enrollment server device 120. The network 132 may include a local area network (LAN), the Internet, a combination thereof, or the like. In some embodiments, the telephone server and the enrollment server operating on the telephone server device 104 and the enrollment server device 120 separately or together on a single server device are on-site at a controlled-environment facility, and in other embodiments, the telephone server device 104 operating the telephone server is on-site at the controlled-environment facility while the enrollment server device 120 operating the enrollment server is remote from the controlled-environment facility.

A database (DB) device 130, operating a database with an appropriate database management system (DBMS), is connected to the enrollment server device 120. The DB device 130 when operated on a separate device may be directly connected to the enrollment server device 120 using one or more interface card (not specifically shown). In other embodiments, the DB device 130 when operated on a separate device may be coupled to the enrollment server through a network, such as network 132. In some embodiments, the DB device 130 may be operated on the same device as the enrollment server, such as on the enrollment server device 120. The DB device 130 may be located at a same location as the enrollment server device 120 or located remotely from the enrollment server device 120. The DB device 130 can include one or more processor for operating the DBMS, system memory for storing program instructions of the DBMS, and database memory for storing the database.

Processor(s) in the DB device 130 may be any processor capable of executing program instructions. For example, in various embodiments, processor(s) may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors may commonly, but not necessarily, implement the same ISA. System memory of the database device may be configured to store program instructions and/or data accessible by processor. In various embodiments, system memory may be implemented using any suitable tangible or non-transitory memory medium. As illustrated, program instructions and data implementing certain operations, such as, for example, the DBMS, may be stored within system memory as program instructions and data storage, respectively. In other embodiments, program instructions and/or data may be received, sent or stored upon different types of computer-accessible media or on similar media separate from system memory or the DB device 130. Generally speaking, a computer-readable medium may include any tangible or non-transitory storage media or memory media.

The DBMS may be structured query language (SQL)-based, IBM DB2, or the like. The database can be stored in any acceptable memory technology, such as redundant array of independent disks (RAID) or the like.

A terminal 134 is connected to the enrollment server device 120. The terminal 134 can be any acceptable device for retrieving a roster for enrollment. The terminal 134 can be, for example, a workstation computer connected directly or through a network (e.g., network 132) to the enrollment server device 120 using various interface cards (not specifically shown). As will be illustrated further below, the workstation computer can download a roster from the enrollment server device 120, which may be printed using a printer connected to the workstation computer. In other embodiments, the terminal 134 can be one or more I/O device, such as a monitor, a printer, a keyboard, a mouse, or the like, connected to the enrollment server device. The I/O devices can be used to initiate the generation and optional printing of a roster from the enrollment server device. In further embodiments, the terminal 134 can be a thin device, such as a tablet, smartphone, or the like, that can be coupled to the enrollment server device 120 using, at least in part, a wired and/or wireless network. In the illustrated embodiment, the terminal 134 is on-site at the controlled-environment facility.

A person of ordinary skill in the art will appreciate that computer systems (e.g., server devices 104 and 120, DB device 130, and/or terminal 134) are merely illustrative and are not intended to limit the scope of the disclosure described herein. In particular, the computer systems and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 2:
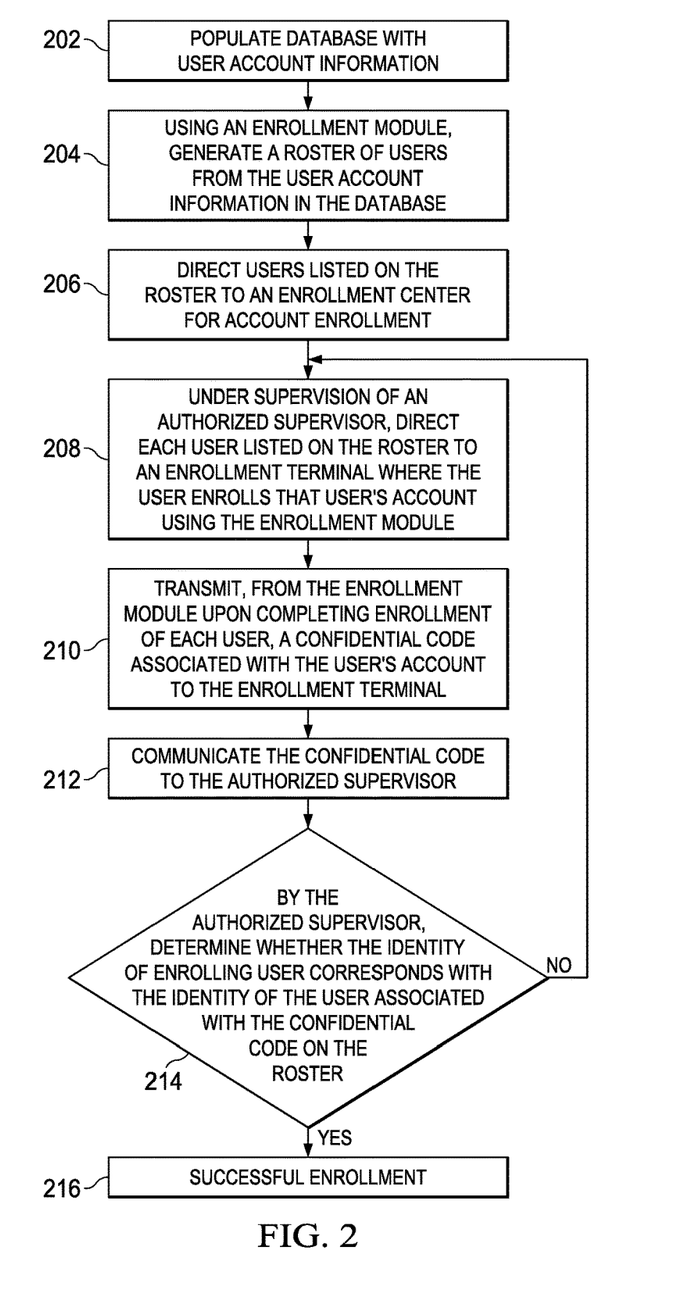
FIG. 2 is a flowchart of a process for enrolling an account in accordance with some embodiments.

FIG. 2 illustrates a flowchart of a process for enrolling an account in accordance with some embodiments. The method of FIG. 2 is discussed below as operating in the context of the system of FIG. 1, as illustrated. One of ordinary skill in the art will readily understand that the method of FIG. 2 may operate in other environments and systems, such as in modifications of FIG. 1 discussed above or other environments and systems.

In step 202, a database is populated with user account information. For example, in the context of FIG. 1, the database of the DB device 130 is populated with user account information, such as for each user, the user's name and unique personal identification number (PIN). Further, in the environment of a correctional facility, the user account information may further include each user's living unit. The database may be populated by any acceptable technique and in any acceptable format. In an example, the enrollment module 128 may be used to populate the database with the user account information.

In step 204, a roster of users is generated from the user account information in the database using an enrollment module, e.g., operating on an enrollment server. The roster includes a list of a plurality of users' identification information, such user names, PINs, or the like. The roster also includes a confidential code associated with each user's identification information, which confidential code is to remain in secret from the user through the completion of enrollment. The confidential code of each user may be unique from the confidential codes of other users. The roster can include other information, such as in a correctional facility example, living unit of each user. The roster can be sorted in a manner to make identification of users simplified, such as in a correctional facility example, sorted by living unit first and then sorted alphabetically by name.

As an example, in the context of FIG. 1, the enrollment module 128 operating on the enrollment server of the enrollment server device 120 can query the database operating on the DB device 130 to identify and generate a list of users for the roster. The querying can be initiated by a command sent to the enrollment module 128 on the enrollment server from the terminal 134. The query can cause a subset of the user information populated in the database to be returned to generate the roster. The enrollment module 128 can generate the confidential code for each user's identification information listed on the roster. The confidential code may be randomly assigned and may be a number, a word, color, or any other item. As an example, the confidential code could be any randomly assigned two-digit number (e.g., 00 to 99). The enrollment module 128 may return the confidential code to the database on the DB device 130 for storing with other account information. The roster then may be accessed by and/or sent to the terminal 134 at the controlled-environment facility. A physical embodiment of the roster with confidential codes (separate from the system of FIG. 1) may be created, such as by printing the roster with confidential codes.

In step 206, the users listed on the roster are gathered and directed to an enrollment center for account enrollment. This can include, in a controlled-environment facility, identifying residents listed on the roster and escorting those residents from their living quarters to the enrollment terminal bank 102 in a secured room (e.g., an enrollment center) or the enrollment may take place in the residents' pod, cell, or any other location that has an enrollment terminal. The users listed on the roster are subsequently under the supervision of an authorized supervisor that is capable of supervising the actions of the users, such as during an enrollment process that is described below.

In step 208, under the supervision of the authorized supervisor, each user listed on the roster is directed to an enrollment terminal where the user enrolls that user's account using the enrollment module. For example, in the context of FIG. 1, each user is directed to one enrollment terminal 102-1 through 102-N, which is a telephone in this example. The user, the authorized supervisor, or another individual, using the enrollment terminal 102-1 through 102-N, can dial into the enrollment module 128 through the telephone server operating on the telephone server device 104 or otherwise set the enrollment terminal 102-1 through 102-N into an enrollment mode, such as if the enrollment terminal 102-1 through 102-N is not a dedicated enrollment terminal, or the user can be automatically connected to the enrollment module 128 through the enrollment terminal 102-1 through 102-N and the telephone server, such as if the enrollment terminal 102-1 through 102-N is a dedicated enrollment terminal. Once connected to the enrollment module 128, the user can access the user's account using the user's identification information (e.g., PIN) by, for example, dialing in such information using a keypad or by input through another device on the enrollment terminal 102-1 through 102-N. The enrollment module 128 can then prompt the user to provide information to enroll the account. In some situations, the information used to enroll the account may include biometric information, such as voice samples of the user or the like. The voice samples can be used to generate a model that is used to compare against subsequent phone calls to help ensure the identity of the person making the phone calls is the enrolled user. The information gathered and/or generated from the enrollment of the user (e.g., transmitted to and received by the enrollment module 128) may then be saved with that user's account information in the database operating on the DB device 130.

In step 210, after the user successfully completes enrollment at the enrollment terminal, the enrollment module transmits the confidential code associated with that user's account to the enrollment terminal to be communicated to the user. In the example of FIG. 1 where the enrollment terminal 102-1 through 102-N is a telephone, the confidential code could be transmitted from the enrollment module 128, via the telephone server, to the enrollment terminal 102-1 through 102-N as an audio transmission to the handset of the enrollment terminal 102-1 through 102-N using, for example, a text-to-speech module or prerecorded prompts in the enrollment module 128, and in some implementations, the confidential code could be repeated. In some embodiments, the transmission can be text displayed on the enrollment terminal 102-1 through 102-N or the like.

In step 212, the confidential code is communicated to the authorized supervisor. In some embodiments, the user enrolling the account can terminate the session at the enrollment terminal 102-1 through 102-N and speak the confidential code to the authorized supervisor. In some embodiments, the user can indicate to the authorized supervisor that enrollment has been completed, and the authorized supervisor may be brought to the enrollment terminal 102-1 through 102-N and have the confidential code communicated from the enrollment terminal 102-1 through 102-N directly to the authorized supervisor, for example, by listening to the confidential code being repeatedly played audibly over the handset of the enrollment terminal 102-1 through 102-N.

In step 214, the authorized supervisor determines whether the observed identity of the user that enrolled in the account corresponds to the identity of the user associated with the confidential code listed on the roster to verify that the user enrolled in the correct account. For example, if Bob Smith is the observed identity of the person enrolling, the authorized supervisor will locate the confidential code listed on the roster and associated with Bob Smith, and compare that confidential code on the roster to the confidential code received from the enrollment terminal 102-1 through 102-N. If the confidential code provided by the enrollment module for the user matches the confidential code listed on the roster for the identified user, then the authorized supervisor may have increased assurance that the person that enrolled the account was the correct user and enrollment was successful, as shown in step 216. If the confidential code provided by the enrollment module does not match the one listed on the roster for that person, then the person enrolling the account was not the user of the account, and the authorized supervisor can flag the event for subsequent correction and/or direct that user to an enrollment terminal for enrolling the user's account, as shown in step 208, with the process repeating from step 208.

In some embodiments, the authorized supervisor may supervise the enrollment of many users substantially simultaneously. The communication of the confidential code to the authorized supervisor upon enrollment by users can allow the authorized supervisor to view the actions of many users on a larger scale without having to directly supervise the individualized, detailed enrollment of each user, such as by listening in on the call as each individual user enrolls or by locking the terminal to only allow an individual user to enroll one at a time. The confidential code and verification by the authorized supervisor can provide assurance that the correct user enrolled a specified account.

In some embodiments, an additional assurance and efficiency may be provided by staggering the enrollment of users when many users are being enrolled substantially simultaneously. By staggering the enrollment, potential collusion between users may be more easily identified. For example, in a correctional facility environment where a first resident is attempting to coerce a second resident to enroll in the first resident's account while the first resident is to enroll in the second resident's account, by staggering those residents' enrollments, the resident enrolling first would have to guess at the confidential code that is to be provided to the resident enrolling second since the resident enrolling second would not have received a confidential code by the time the resident enrolling first received a confidential code. Further, to the extent that a resident could delay communicating a confidential code to the authorized supervisor until another resident received a confidential code and those residents exchanged confidential codes, the authorized supervisor would be able to detect the delay and flag the event for investigation.

Figure 3:
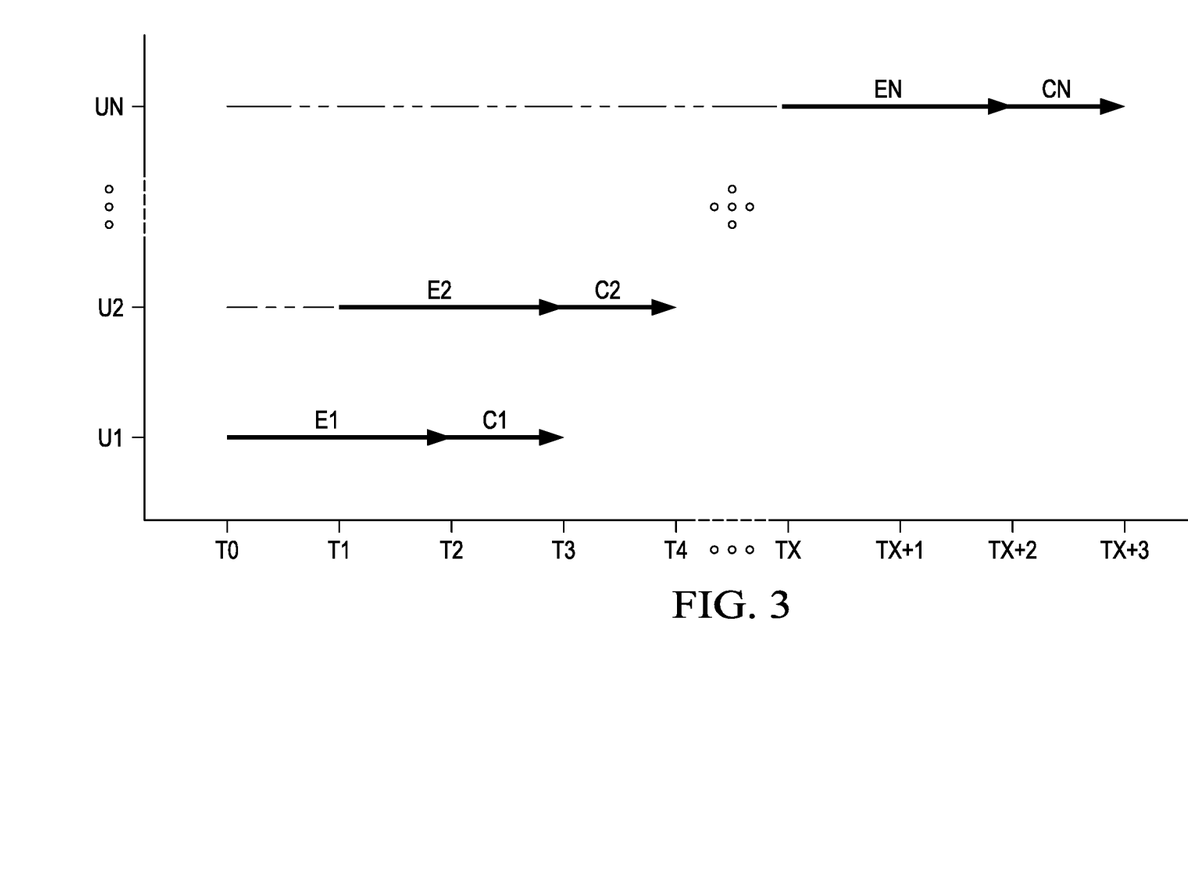
FIG. 3 is a timing chart to illustrate the staggering of enrollment in accordance with some embodiments.

FIG. 3 illustrates a timing chart to further illustrate the staggering of enrollment. The staggering can occur by operation of when the authorized supervisor sends users to the enrollment terminals (e.g., at staggered intervals) and/or by operation of delays and/or controls of the enrollment module. For example, the authorized supervisor could send a first user U1 to a first enrollment terminal 102-1 to begin enrollment event E1 at time T0. After a time period has elapsed with the first user U1 enrolling at first enrollment event E1, the authorized supervisor could send a second user U2 to a second enrollment terminal 102-2 to begin second enrollment event E2 at time T1. With the natural progression of the enrollment events E1 and E2 and the delay in beginning the second enrollment event E2, the first user U1 receives a confidential code during a first communication event C1 between times T2 and T3, and the second user U2 receives a confidential code during a second communication event C2 between times T3 and T4. This pattern can continue for many (e.g., N number) users.

In other examples, the enrollment module can have specified latencies and/or controls that can allow for staggered enrollment and/or communication of confidential codes. For example, if the authorized supervisor sends multiple users U1 through UN to enrollment terminals 102-1 through 102-N at the same time (e.g., at time T0), the enrollment module 128 may generate latencies (illustrated by dashed lines preceding events) to stagger enrollment events E1 through EN.

Even further, the enrollment module may have controls to prevent certain events from overlapping. For example, if the first user U1 has a significantly longer enrollment event E1 than the second user U2 has of the second enrollment event E2, there is a potential risk that communication events C1 and C2 may overlap such that the users U1 and U2 may be able to exchange confidential codes even though the enrollment events E1 and E2 were staggered. The enrollment module may, before initiating a communication event (e.g., second communication event C2), determine whether there was a preceding communication event (e.g., first communication event C1), and if so, whether that communication event is still on-going. If the preceding communication event is still on-going, the enrollment module may prevent the initiation of another communication event until the previous communication event is completed. Further still, once the enrollment module determines that the previous communication event is completed, the enrollment module may provide for some latency (e.g., 5 seconds, 10 seconds, 20 second, 30 seconds, etc.) after the completion of the previous communication event before initiating another communication event. These additional measures may make an attempted exchange of confidential codes more easily detectable by the authorized supervisor.

The staggering of various events can be accomplished by any combination of an authorized supervisor staggering events and/or the enrollment module having a latency and/or control. One of ordinary skill in the art will readily envisage many different combinations and their applications.

The foregoing examples include aspects that may occur as a matter of practicality for various controlled-environment facilities. For example, with some correctional facilities, the authorized supervisor may not have access to the enrollment module while users are enrolling, and thus, the authorized supervisor may require possession of a roster print-out containing the confidential codes. In other facilities where security may be less of a concern, the authorized supervisor may have access to the enrollment module (e.g., through terminal 134) while users are enrolling. In these situations, the enrollment process may be simplified.

Figure 4:
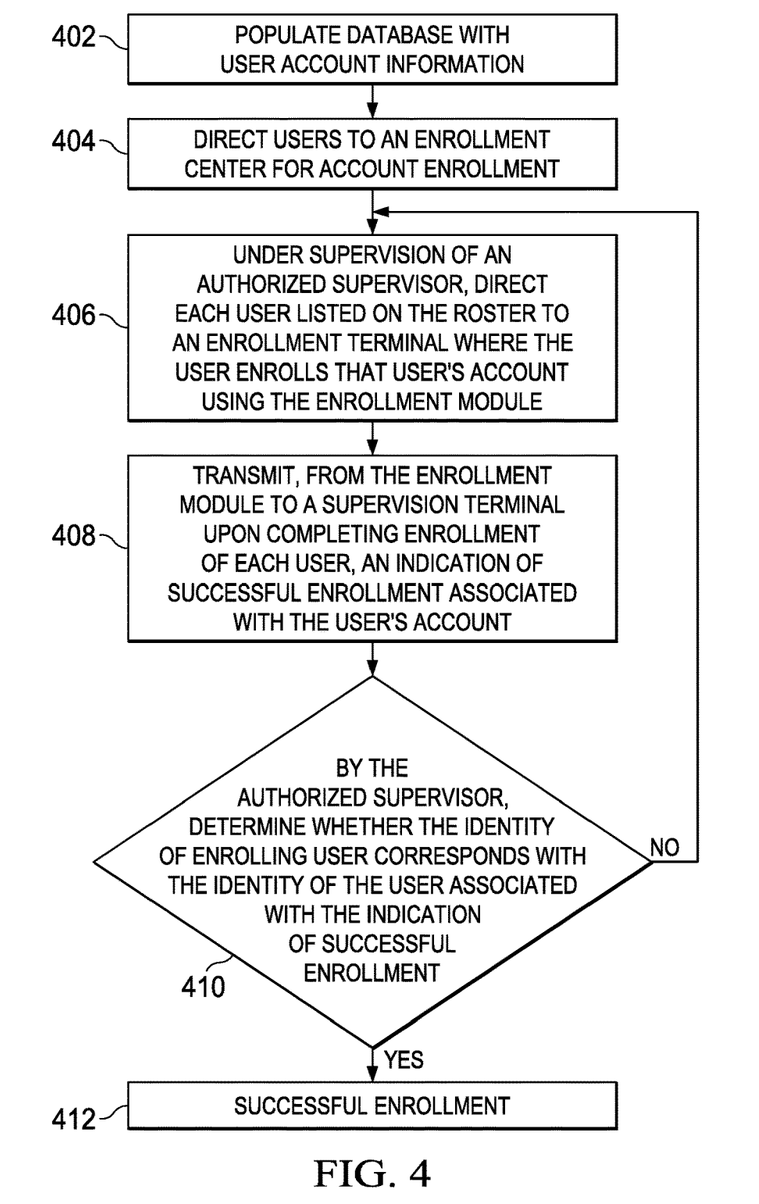
FIG. 4 is a flowchart of a simplified process for enrolling an account in accordance with some embodiments.

FIG. 4 illustrates an example of a simplified enrollment process. As with step 202 of FIG. 2, step 402 of FIG. 4 includes populating a database with user account information. In step 404, users are directed to an enrollment center or a terminal capable of enrollment for account enrollment.

The users are subsequently under the supervision of an authorized supervisor that is capable of supervising the actions of the users, such as during an enrollment process. Similar to step 208 discussed above, in step 406, under the supervision of the authorized supervisor, each user is directed to an enrollment terminal where the user enrolls that user's account using the enrollment module. In step 408, after the user successfully completes enrollment at the enrollment terminal, the enrollment module transmits to a supervision terminal (e.g., terminal 134) including a computer, smartphone, tablet or the like accessible by the authorized supervisor an indication of successful enrollment associated with the user's account. The indication may include user identification information, such as name, and on which enrollment terminal the user enrolled the account. In step 410, the authorized supervisor determines whether the identity of the user that enrolled in the account corresponds to the indication of successful enrollment associated with the user's account. For example, the indication can state that John Doe enrolled on Terminal 1, and the authorized supervisor determines whether John Doe was the person enrolling on Terminal 1. If the identity matches the indication, then the authorized supervisor may have increased assurance that the person that enrolled the account was the correct user and enrollment was successful, as shown in step 412. If the identity does not match the indication, then the person enrolling the account was not the user of the account, and the authorized supervisor can flag the event for subsequent correction and/or direct that user to an enrollment terminal for enrolling the user's account, as shown in step 406, with the process repeating from step 406. This process may implement staggering or other aspects described above.

Use of some embodiments, such as those described above, may allow for less stringent oversight of the enrollment process, and hence, may achieve greater efficiency, than traditional methods, while still maintaining a degree of assurance that enrollment was proper. Some embodiments allow one or few authorized supervisors to oversee the enrollment of many users substantially simultaneously. In embodiments employing a confidential code that uses two-digit numbers, for example, a person guessing the code would have a one percent (1%) chance of guessing the code correctly. Hence, by identifying a confidential code correctly, the user shows a strong likelihood that enrollment was proper. This allows for a better allocation of human resources in the controlled-environment facility due to the increased efficiency of enrollment according to discussions above over traditional methods. Further, aspects of the above discussion can be performed in the context of initial intake (e.g., booking) of one to many residents in the controlled-environment facility as well as a large scale general population enrollment that may be necessary, such as when there is a change in the facility's account manager or provider.

Although some embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing communication services to detainees at a controlled-environment facility, the method comprising:
   generating, by an enrollment module operating on at least one processor, respective confidential codes associated with user accounts for accessing the communication services, each of the user accounts associated with at least one of the confidential codes, each of the user accounts being for use by a respective individual user;
   before receiving enrollment information from the users, generating, by the enrollment module, a roster including the user identification information of the user accounts and the confidential codes associated with the user accounts;
   transmitting the roster a first confidential code of the generated confidential codes to a first enrollment location, wherein the roster comprises a first confidential code associated with identity information for a first enrolling user an enrolling individual;
   receiving, from an enrollment terminal at the first enrollment location, enrollment information for the first enrolling user, the enrollment information used to enroll the first enrolling user enrolling individual for use of a respective user account, wherein the enrollment information is provided at the enrollment terminal, under supervision of a supervisor by the first enrolling user;
   after enrolling the first enrolling user based on the enrollment information, transmitting the first confidential code from the enrollment module to the enrollment terminal; and
   confirming the individual at the enrollment terminal as the first enrolling user individual based on the identity information associated with the first confidential code transmitted to the first enrollment location, wherein the supervisor identifies the confidential code matching the first confidential code within the generated confidential codes included in the roster based on matching an observed identity of the individual at the enrollment terminal with the identity information associated with the first confidential code in the roster.

2. The method of claim 1, wherein the confidential codes are generated randomly.

3. The method of claim 1, wherein the enrollment information includes biometric information identifying the first enrolling user.

4. The method of claim 3, wherein the biometric information includes one or more voice sample.

5. The method of claim 1 further comprising transmitting the enrollment information from the enrollment module to a database for storage with the respective one of the user accounts.

6. The method of claim 1, wherein the transmitting of the first confidential code from the enrollment module to the enrollment terminal, is staggered in time from the transmission of additional confidential codes to enrollment terminals at the controlled-environment facility.

7. An enrollment center system for enrolling residents detained at a controlled-environment facility, the system comprising:

a database system communicatively coupled to an enrollment server and configured to store resident account information;

a first enrollment terminal communicatively coupled to the enrollment server, the first enrollment terminal configured for use in the controlled-environment facility; and the enrollment server comprising an enrollment module, configured to:
generate a roster specifying identify information for a plurality of enrolling residents and a confidential code associated with the resident account of each of the enrolling residents, transmit the roster to an informational terminal wherein the roster comprises a, first confidential code associated with identity information for a first enrolling resident;

to receive first enrollment information for a first enrolling individual via the first enrollment terminal, and further configured to, wherein the enrollment information is provided at the first enrollment terminal, under supervision of a supervisor, by the first enrolling resident;

determine, based on the received first enrollment information, a first resident account of the plurality of resident accounts, wherein the first resident account corresponds to the provided first enrollment information; and transmit the first confidential code associated with the first resident account to the first enrollment terminal, wherein the identity of the individual at the first enrollment terminal is confirmed based on the identity information associated with the first confidential code transmitted to the first enrollment location; and the informational terminal communicatively coupled to the enrollment server, wherein the supervisor identifies the confidential code matching the first confidential code within the generated confidential codes included in the roster received at the informational terminal based on matching an observed identity of the individual at the enrollment terminal with the identity information included in the roster associated with the first confidential code.

8. The system of claim 7, wherein the enrollment module is further configured to transmit the confidential code to the database system, the database capable of storing the confidential code associated with each resident account.

9. The system of claim 7, wherein the enrollment module is further configured to transmit the enrollment information to the database system, the database capable of storing the enrollment information associated with each resident count.

10. The system of claim 7 further comprising:
a second enrollment terminal communicatively coupled to the enrollment server, the second enrollment terminal at the first enrollment location; and the enrollment server further configured to receive second enrollment information for a second enrolling individual via the second enrollment terminal, the second user account including information matching the provided second enrollment information, and further configured determine a second one of the generated confidential codes associated with the second user account; and further configured to transmit the second confidential code associated with the second matching resident account to the second enrollment terminal, and further configured to transmit the second confidential code to the first enrollment location wherein the identity of the individual at the second enrollment terminal is confirmed based on the identity information associated with the second confidential code transmitted to the first enrollment location.

11. A non-transitory computer-readable storage medium having a computer program embodied thereon, the computer program comprising:
program code instructions for generating respective confidential codes for user accounts for accessing communication services, each of the user accounts associated with at least one of the confidential codes, each of the user accounts being for use by a respective individual user;

program code instructions for generating a roster, the roster to contain a list of respective user identification information and respective confidential codes of the user accounts;

transmitting the roster to a first enrollment location, wherein the roster comprises a first confidential code associated with identity information for a first enrolling user;

program code instructions for receiving first enrollment information from a first enrollment terminal, wherein the enrollment information is provided at the enrollment terminal, under supervision of a supervisor, by the first enrolling user; and program code instructions for, upon successfully receiving the first enrollment information, determining a first user account of the user accounts, the first user account including information matching the provided first enrollment information, transmitting a first one of the confidential codes that is associated with the first user account to the first enrollment terminal, wherein the identity of the individual at the first enrollment terminal is confirmed based on the user identification information associated with the first confidential code in the generated roster by the supervisor by identifying the confidential code matching the first confidential code within the generated confidential codes included in the roster based on matching an observed identity of the individual at the enrollment terminal with the identity information associated with the first confidential code in the roster.

12. The non-transitory computer-readable storage medium of claim 11, wherein the computer program further comprises:
program code instructions for receiving second enrollment information from a second enrollment terminal;

program code instructions for, upon successfully receiving the second enrollment information: determining a second user account of the user accounts, the second user account including information snatching the provided second enrollment information; determining a second one of the confidential codes associated with the second user account; transmitting the confidential code associated with the second matching resident account to the second enrollment terminal, wherein the identity of the individual at the second enrollment terminal is confirmed based on the user identification information associated with the second confidential code in the generated roster; and program code instructions for delaying the transmission of the second of the confidential codes to the second terminal until a time period after transmitting the first of the confidential codes to the first terminal.

13. The non-transitory computer-readable storage medium of claim 11, wherein the computer program further comprises program code instructions for transmitting the respective confidential code of only one user account at a time.

14. The non-transitory computer-readable storage medium of claim 11, wherein the computer program further comprises program code instructions for populating a database with account information of the user accounts, and computer program code instructions for populating the database with the first enrollment information for the first one of the user accounts.

15. The non-transitory computer-readable storage medium of claim 11, wherein the computer program further comprises program code instructions for transmitting the roster to a terminal.

16. The system of claim 10, wherein the enrollment server is configured to delay the transmission of the second confidential code to the second enrollment terminal until a time period after transmitting the first confidential code to the first enrollment terminal.

* * * * *

UNITED STATES PATENT AND TRADEMARK OFFICE
CERTIFICATE OF CORRECTION

PATENT NO. : 10,142,328 B1
APPLICATION NO. : 14/975774
DATED : November 27, 2018
INVENTOR(S) : Charles Barrasso Page 1 of 1

It is certified that error appears in the above-identified patent and that said Letters Patent is hereby corrected as shown below:

In the Claims

In Column 15, Line 50, Claim 9, delete "count" and insert -- account -- therefor.

Signed and Sealed this
First Day of January, 2019

Andrei Iancu
*Director of the United States Patent and Trademark Office*